A. McGARY.
HEATING APPARATUS.
APPLICATION FILED FEB. 28, 1921.

1,429,085.

Patented Sept. 12, 1922.

INVENTOR
Alexander McGary
BY
Gorham Crosby
ATTORNEY

Patented Sept. 12, 1922.

1,429,085

UNITED STATES PATENT OFFICE.

ALEXANDER McGARY, OF NEW YORK, N. Y.

HEATING APPARATUS.

Application filed February 28, 1921. Serial No. 448,678.

*To all whom it may concern:*

Be it known that I, ALEXANDER McGARY, citizen of the United States, and a resident of New York city, in the county of Bronx and State of New York, have invented certain new and useful Improvements in Heating Apparatus, of which the following is a specification.

My invention relates to improvements in heating apparatus and more particularly to portable electric heaters, although the invention will be found useful in many forms of heaters.

The main object of the invention is to provide an arrangement by which the heat from the heater is more effectively and efficiently distributed. Also according to my invention a greater amount of heat may be efficiently obtained with an apparatus of given size. Further and more specific objects, features and advantages will more clearly appear from the detail description given below taken in connection with the accompanying sheet of drawings which form a part of this specification.

Figure 1:
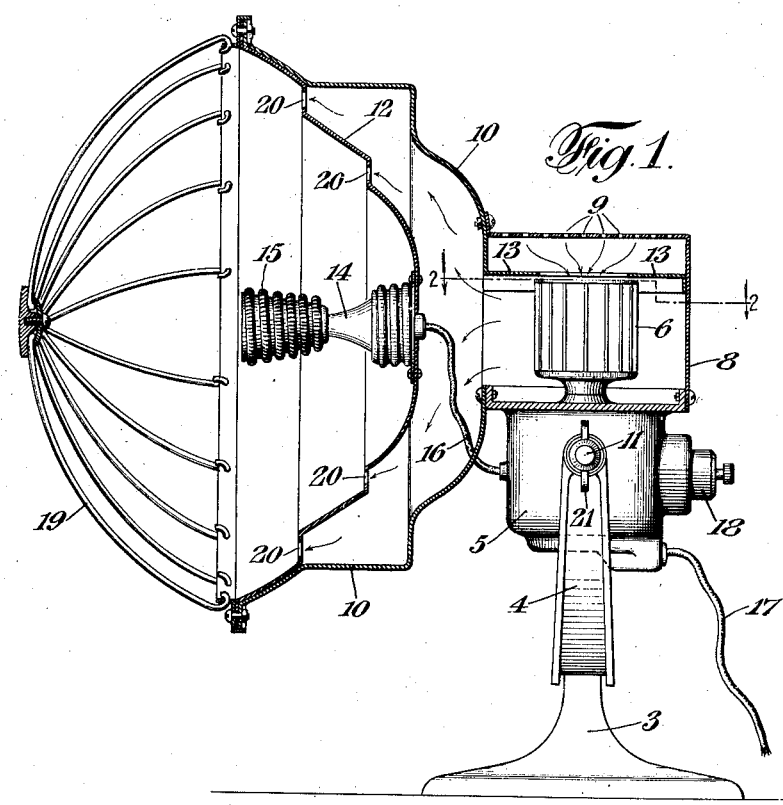
Figure 2:
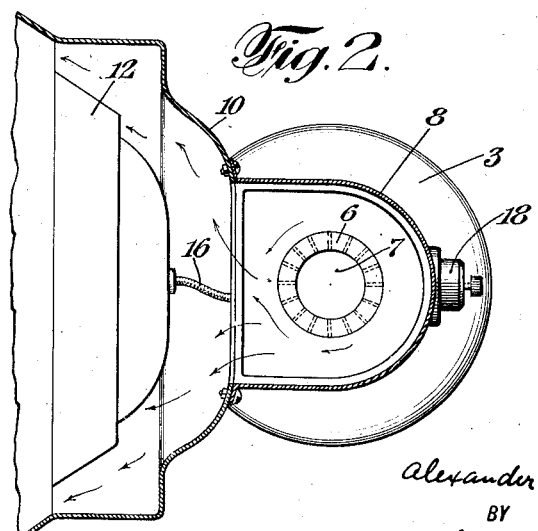

In the drawings, Fig. 1 is a vertical view mostly in vertical section, illustrating an apparatus embodying my improvements in a preferred form thereof, and Fig. 2 is a horizontal section taken on the line 2—2 of Fig. 1.

Referring to the drawings, 3 represents a suitable supporting base frame or bracket having forked arms 4 between which is pivoted at 11 an electric motor 5 having an upwardly extending shaft to which is secured the squirrel cage fan or blower 6 provided with a top central opening at 7 through which the air is drawn in. The fan is surrounded at its sides and top by a casing 8, the top of which is perforated as at 9 to permit the entrance of air to the fan. The casing 8 is secured rigidly to the top of the motor 5, the motor frame serving to close the bottom of the casing. For the motor 5 I prefer to use, if A. C. current is available, a motor known as the vibrating or tuning fork motor, such for example as shown in U. S. Patents Nos. 1,250,914, 1,290,264 and 1,327,250. Such a motor may be connected in series with the heating element 15 hereinafter described, if so desired. Rigidly secured to the casing 8 and hence carried rigid with the motor is the rear wall 10 of a chamber, the front wall of which is formed by a sheet metal reflector 12. That is, the walls 10 and 12 form an enclosed space or chamber into which the casing 8 opens the two forming an air passage in which the fan is located and positioned so that it will blow air into the chamber between the walls 10 and 12. A disk member 13 is located within the casing 8 just above the fan 6 and is provided with a central opening in order that the air drawn in through the openings 9 will be directed into the opening 7 in the top of the fan and the air forced out radially by the fan will be caused to pass into the chamber between the walls 10 and 12.

Centrally secured within the reflector 12 is a stud 14 on which is wound iron wire or other electrical resistance heating element 15, connected to a suitable source of electrical energy through electrical conductors 16 leading into the motor frame. Both the motor and heating element 15 are energized through conductors 17, an electrical switch being provided at 18 by means of which the motor may be deenergized or turned off without deenergizing the heating element 15. The conductors 17 are shown in the usual cord form and may be provided with the usual lamp socket connection by which the whole apparatus may be connected and disconnected at will from the common lamp socket, both the motor and element being energized from the same electrical circuit. A suitable guard or caging 19 is secured to the front of the reflector so as to enclose and protect the heating element. The reflector 12 while of general semispherical or other suitably curved shape, is provided with certain flat portions lying substantially at right angles to the axis of the reflector, which flat portions are provided with perforations 20 through which the air is forced out from the chamber between the walls 10 and 12. Thus the fan is located in a passage back of the reflector, and drives air through the passage and out through the openings 20 past the heating element 15 to carry air heated by the heating element away from the apparatus so that the heat is more effectively and efficiently distributed and felt at a greater distance from the apparatus than would otherwise be the case. The apertures 20 are preferably so positioned that the air currents are not directed directly against the heating element but rather so that they carry outwardly and divergently the air heated from the heating element. This carrying away of the heated air about the heating element tends to reduce the operating temperature of the heating element thereby reducing its resistance so that for a given size of apparatus a greater amount of heat energy may be given off in a given time. I prefer however to so adjust the electrical current and air currents that the heating element 15 will still continue to glow and give off some light so as to have something of the appearance of fire as is common in electrical heating devices. The motor together with casing 8, reflector 12 and heating element may all be swung or rotated together about the pivots 11 to assume any desired position, and they may be held in such adjusted positions by the thumb nut 21 so that the heated air may be directed in any desired direction.

While I have described my improvements in great detail and with respect to a preferred form thereof, the invention is not limited to such details and form since many changes may be made and the improvements embodied in widely different forms, without departing from the spirit and scope of the invention in its broader aspects.

What I claim as new and desire to secure by Letters Patent, is;

1. An electrical heating apparatus having in combination, a supporting frame, an electric motor mounted to swing on said frame, a reflector carried with the motor, an electrical resistance heating element operatively positioned in the reflector, a fan driven by the motor and positioned to drive a current of air past the heating element and out from the reflector.

2. An electrical heating apparatus having in combination, a supporting frame, an electric motor mounted to swing on said frame, a reflector carried with the motor, an electrical resistance heating element operatively positioned in the reflector, said reflector being perforated, an air chamber back of the reflector and a fan driven by the motor and acting to force air through the said air chamber and through the perforated reflector to drive the air past the heating element and out from the reflector.

3. An electrical heating apparatus having in combination, an electric motor, a reflector, an electrical resistance heating element operatively positioned in the reflector, said reflector being perforated, an air chamber back of the reflector and a fan driven by the motor and acting to force air through the said air chamber and through the perforated reflector to drive the air past the heating element and out from the reflector.

4. An electrical heating apparatus having in combination a frame, an electric motor mounted to swing on said frame, an electrical resistance heating element carried with the motor so as to swing therewith on the frame, and a fan driven by the motor and positioned to drive a current of air past the heating element to carry the air heated by the heating element away therefrom.

5. An electrical heating apparatus having in combination an air chamber provided with an intake, an electrical motor, a fan driven by the motor and located to draw air through the intake and to drive it through said air chamber, said motor and fan operating about a vertical axis, and an electrical heating element operatively positioned with respect to the air chamber whereby the fan drives air past the heating element to carry air heated by the heating element away therefrom.

6. An electrical heating apparatus having in combination, an electric motor, a reflector carried with the motor, an electrical resistance heating element operatively positioned in the reflector, and a fan driven by the motor and positioned to drive air past the heating element to carry air heated by the heating element away therefrom.

7. An electrical heating apparatus having in combination, an electric motor, a fan driven by the motor and an electrical resistance heating element in front of the fan whereby the fan drives air past the heating element to carry air heated by the heating element away therefrom, connections for energizing both the motor and heating element from the same electrical circuit and means carried by the motor for disconnecting the motor from said circuit without disconnecting the heating element therefrom.

8. An electrical heating apparatus having in combination, a supporting frame, an electric motor mounted to swing on said frame, a reflector carried with the motor, an electrical resistance heating element operatively positioned in the reflector, an air passage back of the reflector, and a fan in said air passage and positioned to drive air through said air passage and past the heating element to carry air heated by the heating element away therefrom.

9. A heating apparatus having in combination, a reflector, a heating element operatively positioned in the reflector, an air passage back of the reflector, an electrical motor and a fan driven by the motor and positioned in said air passage to drive air past the heating element to carry air heated by the heating element away therefrom.

10. An electrical heating apparatus having in combination an air chamber provided with an intake, an electrical motor positioned below said intake and operating about a vertical axis, said fan being located below said intake and arranged to draw air downwardly through the intake and drive it forward through said air chamber, and an electrical heating element located in front of the motor and said fan and operatively positioned with respect to the air chamber whereby the fan drives air past the heating element to carry air heated by the heating element away therefrom.

Signed at New York city in the county of New York and State of New York this 24th day of February, A. D. 1921.

ALEXANDER McGARY.